No. 883,114. PATENTED MAR. 24, 1908.
O. O. KRUH.
VAPOR ELECTRIC APPARATUS.
APPLICATION FILED OCT. 18, 1905.

2 SHEETS—SHEET 1.

Witnesses:
George H. Tilden.
Helen Orford

Inventor:
Osias O. Kruh,
by Albert G. Davis
Att'y.

No. 883,114. PATENTED MAR. 24, 1908.
O. O. KRUH.
VAPOR ELECTRIC APPARATUS.
APPLICATION FILED OCT. 18, 1905.
2 SHEETS—SHEET 2.
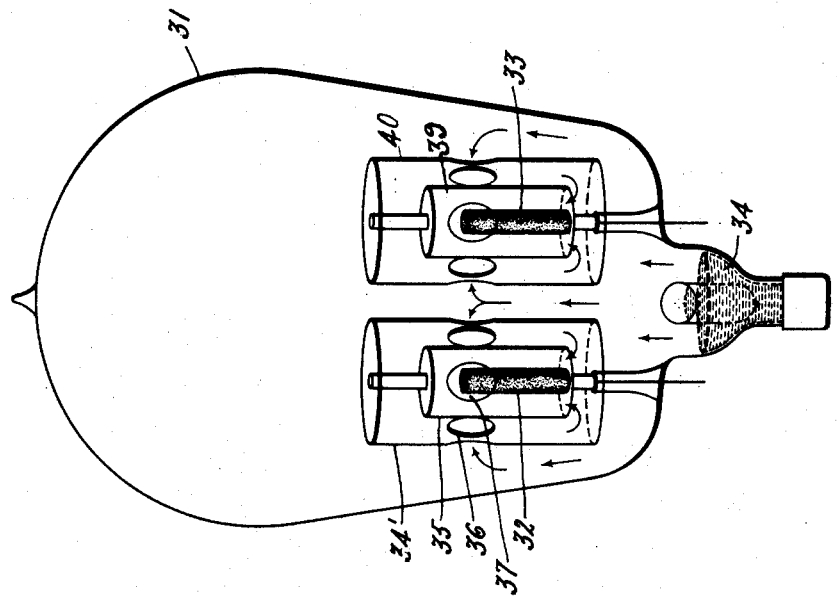
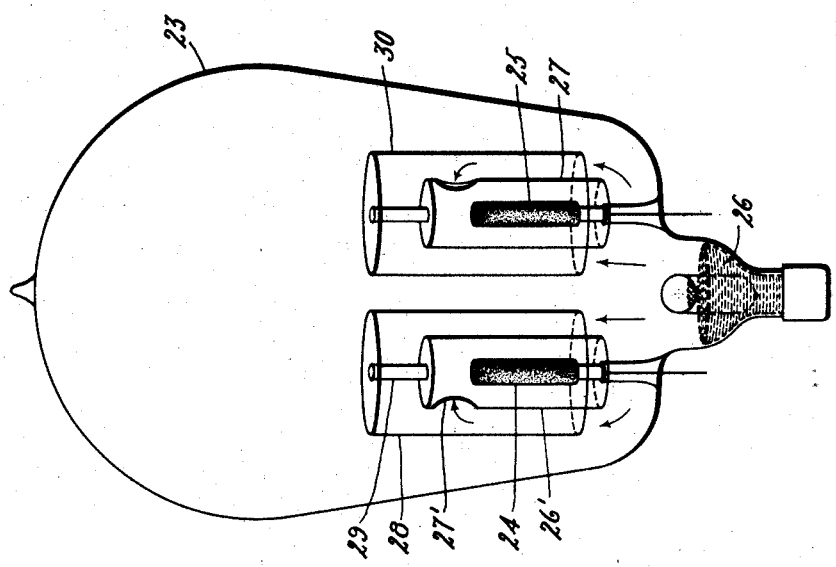
Witnesses:
George W. Tilden.
Helen Orford
Inventor:
Osias O. Kruh,
by Albert G. Davis
Att'y.

UNITED STATES PATENT OFFICE.

OSIAS O. KRUH, OF SCHENECTADY, NEW YORK, ASSIGNOR TO GENERAL ELECTRIC COMPANY, A CORPORATION OF NEW YORK.

VAPOR ELECTRIC APPARATUS.

No. 883,114.      Specification of Letters Patent.      Patented March 24, 1908.

Application filed October 18, 1905. Serial No. 283,258.

*To all whom it may concern:*

Be it known that I, OSIAS O. KRUH, a subject of the Emperor of Austria-Hungary, residing at Schenectady, county of Schenectady, and State of New York, have invented certain new and useful Improvements in Vapor Electric Apparatus, of which the following is a specification.

My present invention relates to apparatus in which electric discharges or arcs take place in evacuated inclosures, and more particularly to apparatus using alternating current as a source of current supply.

The invention may be embodied in devices of this character used as rectifiers, lamps or the like, and embodies various novel features of construction as pointed out more particularly in the appended claims.

Figure 1:
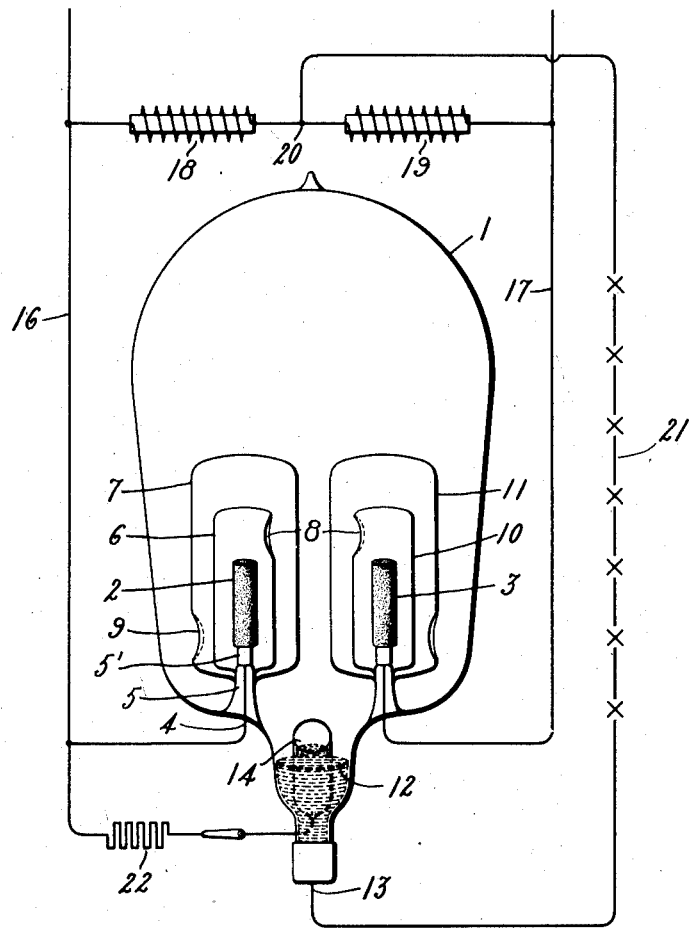
Figure 2:
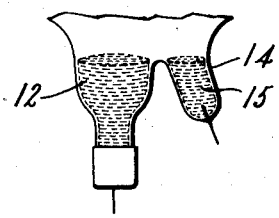

The invention itself, however, will be better understood by reference to the following description taken in connection with the accompanying drawings in which Figure 1 represents one embodiment of my invention; Fig. 2 a detail, and Figs. 3 and 4 modified forms of my invention.

In vapor electric devices, so called because the arcs therein are maintained through the medium of a vapor, a plurality of anodes are usually employed where the apparatus is to be used in connection with a source of alternating current supply. These anodes constitute the terminals of electric arcs which play between the respective anodes and a common negative electrode or cathode. Under certain conditions of operation it sometimes happens that an arc takes place from anode to anode, thereby forming a short circuit, which though momentary may be sufficiently violent, or if often repeated, to injure or destroy the apparatus. I overcome this trouble by providing the anodes with shields which direct the arc stream emanating from the cathode in a manner to protect the anodes from any spattering or other emission of mercury from the cathode, of which material the cathode is usually composed, and which serve also to protect the anodes from any other radiation or emanation from the cathode. The shields are also arranged to protect the anodes from any dropping of globules of condensed mercury taking place in the evacuated inclosure in which the anodes are located.

In Fig. 1, I have represented a mercury vapor rectifier for changing alternating current into direct current. The rectifier tube consists of an exhausted receptacle 1, generally of glass, which tube is provided with suitable electrodes. The positive electrodes or anodes are indicated at 2 and 3 and may be formed of cylinders or plates, or other suitable shapes, of artificial graphite, titanium carbid, iron, or the like. Current is conveyed to each electrode by means of leading-in wires which pass through the wall of the receptacle 1. In the case of the anode 2, the leading-in wire, usually of platinum, is shown at 4 and is sealed through the inner end of a reëntrant portion 5 of the tube 1. The portion of the wire 4 extending between the anode and the reëntrant member 5 is surrounded by a coating of vitreous material 5', such as lava, hard glass, or the like. The shields for the anode 2 may, of course, vary widely in form and still retain their essential functions. The present arrangement, however, consists of an inner shield 6 and an outer shield 7. This shield 6 is a tube of glass or the like, the lower end of which may be sealed about the part 5', while the upper end extends over and beyond the anode 2 and is closed. An opening 8, however, is formed in the side of the tubular shield 6, which serves as a passage for the arc stream going to the anode 2. The outer shield 7 surrounds the shield 6 and is conveniently arranged concentric therewith. This shield is closed at the top as indicated, and may be sealed at its bottom portion about the part 5' by which it, as well as the inner shield 6, is supported. An opening 9 into the outer shield 7 is provided near the lower end thereof and preferably at the side opposite the anode 3 which coöperates with the anode 2. The anode 3 is provided with shields 10 and 11 substantially the same in construction and arrangement as the shields 6 and 7. Thus no special description of these shields is necessary.

The negative electrode or cathode with which the anodes 2 and 3 coöperates, consists of a body of mercury 12 located in a pocket formed in the lower end of the tube 1. A leading-in wire 13 serves as usual to convey current flowing between this electrode and an outside circuit. A starting anode, which like the electrode 12 is of mercury, is provided for starting the apparatus into operation in the usual manner. The opening into the small pocket or chamber containing the mercury constituting the starting electrode, is shown in Fig. 1 at 14, while the depending portion of the pocket is indicated in dotted lines. This starting electrode and the pocket containing it is, however, shown better by the detail view in Fig. 2, which represents the appearance of the lower portion of the tube looking from a position at right angles to that shown in Fig. 1. The cathode is here shown at 12, while the starting electrode is indicated at 15.

In connecting up the apparatus for operation the anodes 2 and 3 are connected directly to alternating current supply mains such as 16 and 17. Inductance coils 18 and 19 are joined in series across these mains. The junction point 20 between them extends to a consumption circuit 21, the other terminal of which is connected to the cathode 12. For the purpose of starting the rectifier the starting anode 13 is connected through a resistance or other current limiting device 22 to one of the supply leads.

By shaking or tilting the apparatus so as to bring the mercury of the electrodes 12 and 15 into momentary contact, a starting arc ensues which when the current is in the proper direction, causes the main arcs to start between the cathode and the main anodes 2 and 3. A number of trials may perhaps be necessary in some cases before the apparatus starts, as the direction of current may not at the first trial be such as required. When the apparatus is in operation the arc stream from the cathode 12 goes to each of the anodes 2 and 3 and before reaching the corresponding anode it is constrained to follow a path which bends on itself. Thus the arc stream from the cathode 12 passes into the opening 9 and then up through the tubular passage afforded between the concentric walls of the shields 6 and 7 and then into the opening 8 in the inner shield 6 through which it passes to the anode 2. The arc stream as it passes to the opening 9 is of the nature of a high velocity blast which necessarily carries along with it more or less imperfectly vaporized mercury. The greater portion of this superfluous matter is thrown off by the arc stream as it turns into the opening 9. As the arc stream continues farther and then again changes its direction to pass into the opening 8 any remaining superfluous mercury is likewise projected beyond the opening by its momentum. The anode is thereby effectually protected from any spattering or other emanation from the cathode. Moreover it is protected also from any falling drops or globules of mercury which may descend from the walls of the tube 1, as the mercury vapor generated in the apparatus is condensed. Also the anode is protected from the effect of any radiation, perhaps in the nature of ultra violet rays, emanating from the cathode surface. This protection is afforded by the interposed walls of the two glass shields 6 and 7. The whole arrangement thus constitutes a most effective means for preventing arcing between anodes.

I have indicated in passing, some of the causes which I believe are active in producing arcing between anodes. I do not wish to be considered as guaranteeing the accuracy of what from my observations I now consider to be the most likely causes of the arcing, since the beneficial effects of my invention may be obtained, regardless of the reasons therefor, by following the modes of construction which I have pointed out.

Instead of using the apparatus shown in Fig. 1 I may use an arrangement somewhat as shown in Fig. 3. In this figure I have shown merely the rectifier tube without indicating the connections of such tube to its electric circuits, as such connections are well understood. In Fig. 3, the evacuated receptacle is indicated at 23. The graphite anodes are shown at 24 and 25 and the cooperating cathode at 26. The anodes are as before surrounded by cylinders 26' and 27 closed at both ends and supported in any suitable manner as from the leading-in conductors of the respective anodes. Communication with the anode is afforded in the case of the cylinder 26' by an opening 27' formed in the upper portion of the cylindrical wall and on that side of the cylinder away from the anode 25. A cylindrical shield 28, closed at the top and open at the bottom, is mounted concentrically over the inner shield 26' and may be conveniently supported from a small standard 29 extending from the closed top of the inner shield 26' as indicated. The other anode 25 is likewise provided with an outer shield 30 mounted and arranged in the same manner as the shield for the anode 24, so that no further description thereof is necessary. In either case the outer shields 28 and 30, in addition to serving as an additional safe guard to protect the anodes against contact with falling or otherwise projected particles of mercury, serves also to direct the arc stream passing from the cathode to the anode. The walls of the shield 28 for example constrain the arc stream to pass in a direction tangential to the inner shield 26' and thereby prevents superfluous matter, and particularly condensed mercury, from entering the opening 27' into the inner shield 26' surrounding the anode 24. The momentum acquired by the particles as they are carried along in the arc stream causes them to be projected past the opening 27' so that only that portion of the arc stream enters which is necessary as a vehicle for conveying current.

Still another arrangement of the protecting shields may be employed as indicated in Fig. 4. In this figure the evacuated receptacle of the rectifier is indicated at 31.

The anodes are shown at 32 and 33 and a coöperating mercury cathode at 34. The anode 32 is surrounded by an outer shield 34' and an inner shield 35. The outer shield 34' may be approximately cylindrical in shape and closed at its upper and lower ends. The lower end is supported from the leading-in wire for the anode 32 or better from a body of glass surrounding this wire. Communication with the interior of this shield is afforded by a number of openings such as at 36, 37 and the like, located about the sides of the shield as indicated.

The inner shield 35 is closed at its top and open at the bottom and surrounds the anode 32. It may conveniently be supported by a small rod 38 of glass or the like depending from the inner side of the top of the shield 34'. The coöperating anode 33 is provided with similarly constructed and arranged shields 39 and 40 which require no special description. The arc from the cathode 34 enters the openings 36, 37 and the like, then passes down between the walls of the shields 34 and 35 and then up through the open bottom of the shield 35 to the anode 32. The arc stream is thereby effectually freed from any superfluous matter and the danger from arcing, due to contact of such matter with the anode, is thus obviated. The anode moreover is also well protected against contact with the mercury condensing and falling within the rectifier tube.

The devices shown in this application are covered broadly by the claims in my application Serial No. 194,520 filed February 20, 1904, which is now involved in interferences. This present case is limited to the improvements on the invention of said former application which are herein described and claimed, and the claims herein are therefore not to be construed as covering anything disclosed in my said prior application.

It is evident that various modifications may be made in the embodiment of my invention without departing from the spirit thereof, for which reason I do not wish to be limited to the details shown and described.

What I claim as new and desire to secure by Letters Patent of the United States, is—

1. The combination of a receptacle or container, electrodes therein, and shields therefor arranged one inside of the other.

2. The combination of a receptacle or container, electrodes therein, and shields for said electrodes having non-registering openings therein.

3. The combination of a receptacle or container, a vaporizable electrode therein, a plurality of coöperating electrodes, and shields for each of said coöperating electrodes, the shields for each electrode being located one inside the other.

4. The combination of a receptacle or container, electrodes therein, and shields for one at least of said electrodes, said shields being arranged one about the other and provided with openings located to produce a change in direction of the arc stream going to the electrode.

In witness whereof, I have hereunto set my hand this 17th day of October, 1905.

OSIAS O. KRUH.

Witnesses:
  Benjamin B. Hull,
  Helen Orford.